UNITED STATES PATENT OFFICE.

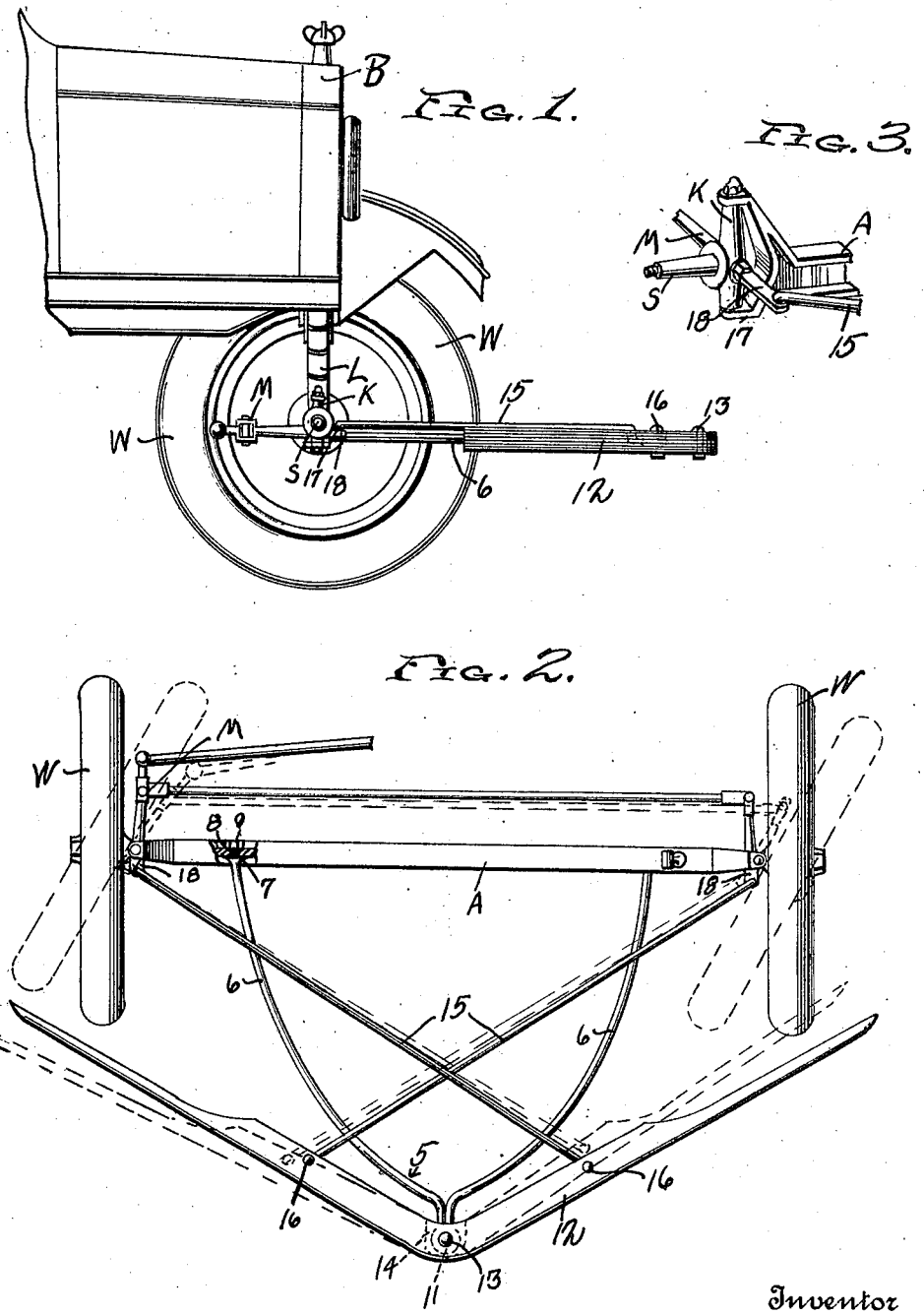

HIRAM W. CHILDRESS, OF UPTON, KENTUCKY.

AUTOMOBILE SAFETY-FENDER.

1,320,314.  Specification of Letters Patent.  Patented Oct. 28, 1919.

Application filed June 9, 1919. Serial No. 302,876.

*To all whom it may concern:*

Be it known that I, HIRAM W. CHILDRESS, a citizen of the United States, residing at Upton, in the county of Hardin and State of Kentucky, have invented certain new and useful Improvements in Automobile Safety-Fenders, of which the following is a specification.

This invention is an automobile safety fender and has for its principal object the production of a device which will automatically retain the fender in the path of movement of the wheels of the automobile.

Another object of this invention is the production of an automobile safety fender wherein a yoke is provided for pivotally supporting the fender, while links are connected to the fender and also to the arms of the steering knuckles, thus causing the fender to be automatically swung to be positioned close to the front wheels of the automobile as the same is being guided from a straight course.

One practical form of construction and assembly of the present invention will be hereinafter described and is illustrated in the drawing, in which:—

Figure 1 is a side elevation of Fig. 2, with the left wheel removed.

Fig. 2 is a top plan view of the device in condition for use.

Fig. 3 is an enlarged detail perspective view of a portion of the front axle and the steering knuckle, showing the manner in which the arms extend from the knuckles to receive the links connected to the fender.

In the preferred embodiment of the present invention, about to be specifically described, for the purpose of illustrating the use of the device, A represents the axle having the usual steering knuckles K from which the stub axles S extend for supporting the wheels W. The automobile body B is supported by the usual leaf springs L while the usual steering mechanism M is connected to the knuckles K for turning the knuckles and shifting the stub axles S for directing the movement of the wheels W. This is only a conventional form of an automobile and no novelty is claimed therefor.

The invention comprises specifically the yoke 5 which is made of sufficiently heavy material and comprises the side arms 6. These side arms 6 have enlargements 7 on their rear ends from which extend threaded shanks 8. These shanks 8 extend through the axle A as shown in Fig. 2 and carry nuts 9 thereon, thus fixedly supporting the yoke 5 upon the front axle. The arms 6 are curved throughout their entire length, converging toward each other at their outer end portions as shown in Fig. 2. Each arm has a forwardly extending projection 10, the projections being parallel to each other and bearing upon each other and being connected together by an eye 11. It will be seen therefore that the eye 11 is carried at a distance in front of the axle A although centrally thereto.

The fender 12 is provided with a central pin 13, this pin also being carried by the eye 11 of the yoke 5, whereby the fender is pivotally supported intermediate its ends. It will be noted that the fender is substantially V-shape, being connected at the angle to the eye 11, as specified, while the side portions of the fender 12 diverge rearwardly to be positioned in front of the wheels W as shown in Fig. 2. It should be understood that the fender 12 may be provided with a socket 14 at the angle thereof, for the reception of the eye 11.

Links 15 are provided for shifting the fender 12 automatically. Each link has its forward end pivoted as indicated at 16 to the fender 12 it being noted that the links 15 cross each other. The rear ends of the links 15 have crank portions 17 fixed to the arms 18. These arms 18 are formed on nuts 18' carried upon projecting ends of the elements M.

It will be noted by referring particularly to Fig. 2 that the links 15 are connected to the arms 18 upon the opposite sides of the device from which they are connected to the fender 12. When the device is in use and the automobile is moving forwardly, the fender will be directly in front thereof as shown in Figs. 1 and 2. When however, the course of movement of the automobile is changed by the actuating of the steering mechanism M with a consequent turning of the wheels W, as indicated in dotted lines in Fig. 2, one link 15 will be pulled upon, while the other will be pushed upon, thus causing the fender 12 to be swung very close to the wheel describing the larger arc of a circle described by the movement of the wheels as the automobile is steered from a straight course. Thus if there be obstructions in the path of movement of the wheels it will be noted, by referring to the dotted lines shown in Fig. 2 that the fender will guard the automobile from striking such obstacles although the manner in which the fender is swung causes the same to be retracted slightly on the outer side of the automobile, owing to the manner in which the same is being turned to miss obstacles which would otherwise be struck thereby if the same were maintained in its normal position in front of axle A.

It will be noted that the operation of the fender 12 is automatic for its position is changed automatically when the steering mechanism is operated for turning the wheels to either side from a straight course. Also the yoke will efficiently support the fender for allowing the same to be swung as specified although the construction of the arms 6 which make the yoke a substantial U-shape allow the fender to swing to one side or the other as shown in dotted lines in Fig. 2 without interference from the yoke.

It will therefore be noted that a very simple and efficient safety fender has been provided for automobiles which is of such nature as to be easily applied to conventional forms of automobiles to be supported by the axles as specified and be connected to the steering mechanism, although of course it is obvious that the yoke may be connected to the body or frame work of the automobile without departing from the spirit of the invention.

After such assembly the steering of the automobile will automatically operate the fender to cause the same to always assume a position directly in front of the wheels whether the automobile is moving in a straight course or is turned from such course, thus preventing the automobile from being injured by running into obstacles in the path of movement thereof.

Although it is stated in the foregoing description that the yoke is secured to the axle, it is obvious that the same may be secured to the body of the vehicle or in any other place desired without departing from the spirit of the invention, since the novelty does not reside in the specific manner of attachment of the device to the automobile but is presented in the construction of the mechanical arrangement and assembly of the invention per se.

The foregoing description and the drawing has reference to the preferred or approved form of my invention. It is to be understood however that such changes may be made in construction and assembly of parts, materials, dimensions, etc., as may prove expedient and fall within the scope of the appended claims.

Having thus fully described my invention, what I claim as new and desire to secure by Letters Patent is:—

1. In combination with a vehicle having a front axle provided with a steering mechanism connected to ground wheels, of a substantially U-shaped yoke fixed upon said axle, a fender pivotally mounted upon said yoke, links pivotally connected to said fender, arms extending from said steering mechanism, said links being pivotally connected to said arms, whereby as the steering mechanism is actuated for shifting said wheels, said arms and links will also shift said fender to cause the same to be directly in the path of movement of said wheels.

2. In combination with a vehicle having a front axle provided with a steering mechanism supported by ground wheels, a yoke formed from a single strand of material and comprising side arms fixed upon said axle, said side arms being curved toward each other at their forward portions, projections extending from the forward portions of said arms and being connected together by an eye, thus forming a substantially U-shaped yoke, a substantially V-shaped fender having a pin connected to said eye for pivotally supporting said fender, arms carried by said steering mechanism and cross links pivotally mounted upon said fender and passing above said yoke to be connected to said arms, whereby as said steering mechanism shifts said wheels to change the movement of said vehicle, said links will also swing said fender to cause the same to be in the direct path of movement of said wheel while said yoke will also steady said link.

3. In combination with a vehicle having a front axle provided with a steering mechanism supported by ground wheels, the steering mechanism also having threaded stems extending forwardly a yoke formed from a single strand of material and comprising side arms fixed upon said vehicle, a fender pivotally mounted upon said yoke, links pivotally connected to said fender, arms having nuts screwed onto said stems, said links being pivotally connected to said arms, whereby the steering mechanism is actuated for shifting said wheels, said arms and links will also fit said standard to cause the same to be directly in the path of movement of said wheels.

4. In combination with a vehicle having a front axle provided with steering mechanism connected to ground wheels, and a rigid yoke fixed upon said front axle and projecting forwardly therefrom, a fender pivoted intermediate its ends upon the forward portion of said yoke, and links connected to said fender and to said steering mechanism, whereby the fender will be automatically swung upon said yoke, as said steering mechanism is actuated.

In testimony whereof I affix my signature in presence of two witnesses.

HIRAM W. CHILDRESS.

Witnesses:
A. P. BOTTS,
ROY T. RAY.

Copies of this patent may be obtained for five cents each, by addressing the "Commissioner of Patents, Washington, D. C."